Oct. 5, 1926.
S. W. AVIS
1,602,141
TRIMMING MECHANISM FOR SEWING MACHINES
Original Filed Jan. 11, 1924    2 Sheets—Sheet 1
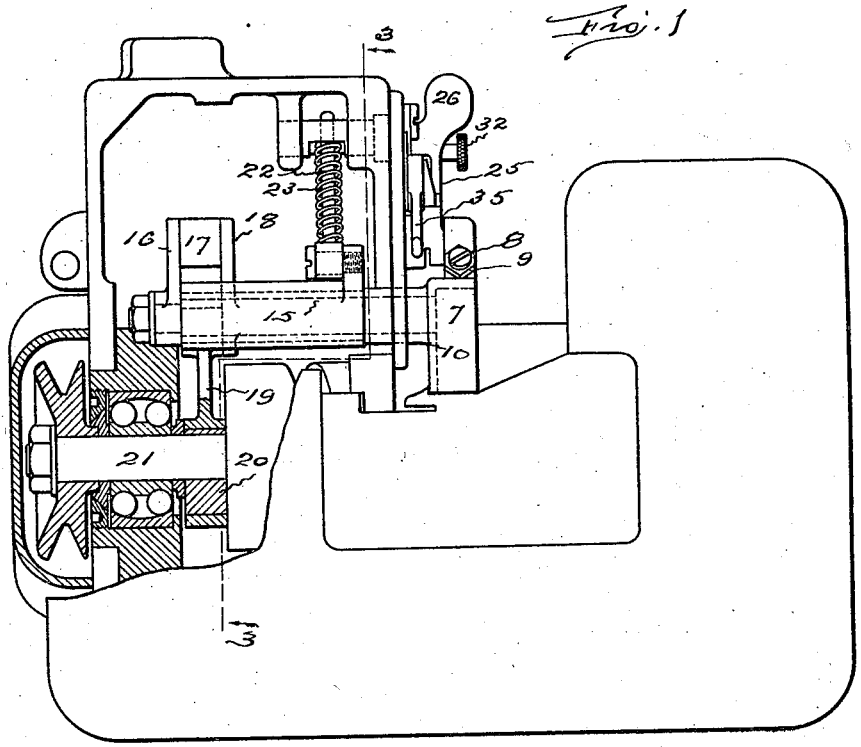
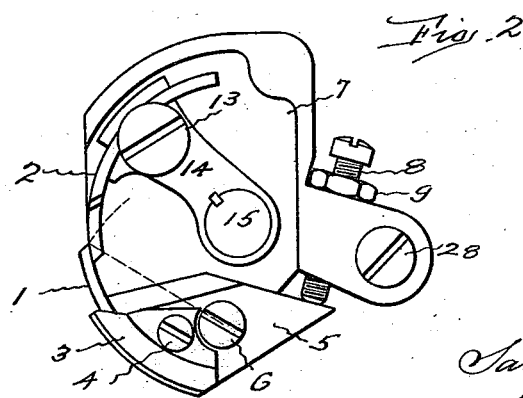
INVENTOR
Samuel W. Avis,
by Harry R. Williams Oct. 5, 1926.
S. W. AVIS
1,602,141
TRIMMING MECHANISM FOR SEWING MACHINES
Original Filed Jan. 11 1924    2 Sheets-Sheet 2
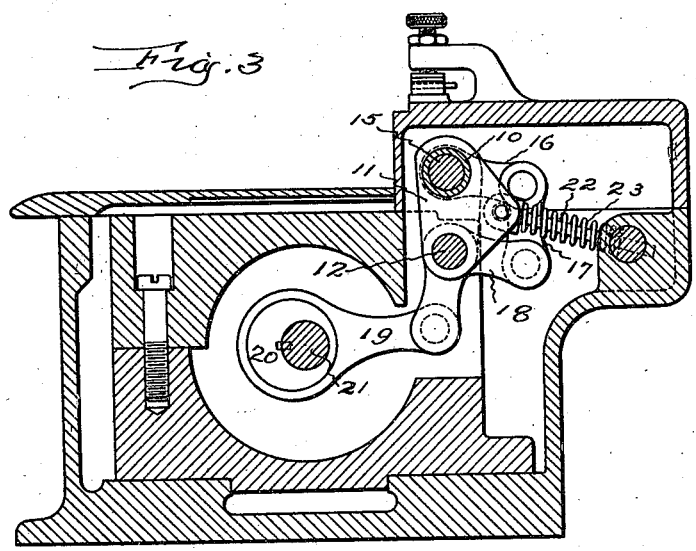
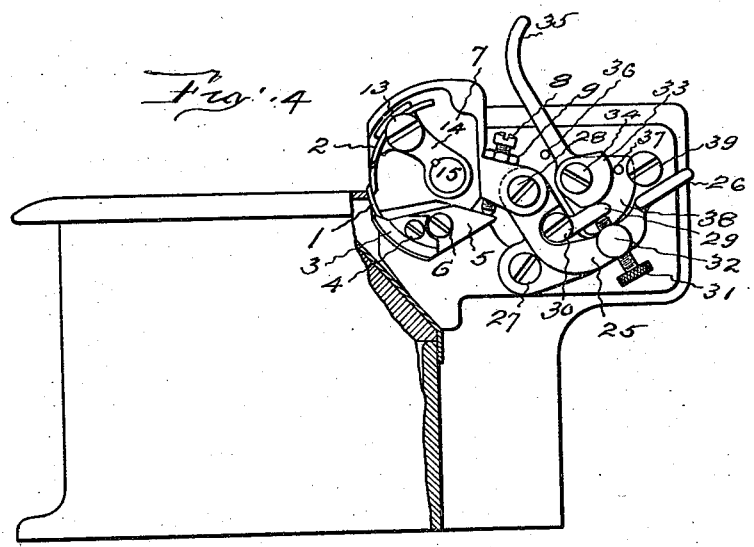
INVENTOR
Samuel W. Avis by
Harry R. Williams
atty.

Patented Oct. 5, 1926.

1,602,141

UNITED STATES PATENT OFFICE.

SAMUEL W. AVIS, OF WEST HARTFORD, CONNECTICUT.

TRIMMING MECHANISM FOR SEWING MACHINES.

Application filed January 11, 1924, Serial No. 685,552. Renewed March 12, 1926.

This invention relates to the mechanism which is applied to sewing machines for trimming the edge, or border finishing, the fabric, which is being stitched, particularly machines which are designed to run at high speeds. The subject of this invention is an improvement of the trimming mechanism illustrated and described in my application for Patent #489,353, filed August 2, 1921, and which trimming mechanism is particularly adapted to an overseam machine of the type illustrated and described in my application for Patent #393,223, filed July 1, 1920.

It is frequently desirable on account of the character of the fabric to vary the distance from the line of stitch to the trimmed edge. The object of the present invention is to so construct the mechanism which carries the trimming cutters that the distance of the trimmed edge of the fabric from the line of stitch may be varied while the machine is running rapidly without interfering with the stitching operation.

In attaining this end means are provided for adjusting the trimming cutters so as to produce any desired normal width from the line of stitch to the trimmed edge, and auxiliary means are arranged in co-operation therewith which permit the cutters to be instantly adjusted so as to increase the width from the line of stitch to the trimmed edge and then returned to the exact position of adjustment for continuing the stitching with the normal width.

In the accompanying drawings Fig. 1 shows a plan of the trimming mechanism adapted to a machine of the character referred to. Fig. 2 shows on larger scale a front elevation of the trimming cutters and the housing by which they are carried. Fig. 3 is a section on the dotted line 3—3 on Fig. 1, showing the means for oscillating the movable trimming cutters and the spring for holding in position the frame which carries the cutters. Fig. 4 is a front elevation of the trimming cutters, the housing in which they are mounted, and the mechanism by which the cutters are normally adjusted, by which they are moved to increase the width of the seam, and then returned to normal position, and by which they may be thrown completely out of operative position.

The trimmer has a cutter 1 which is normally stationary, and a co-operating cutter 2 that is oscillated with relation to the fixed cutter for trimming the edge of the material that is being fed through the machine. These cutters are so mounted that they may be adjusted a distance more or less to one side of the line of stitch, or swung way over out of operative position.

The stationary cutter is a curved strip of suitable metal clamped by a plate 3 and screw 4 to a plate 5 that is pivotally fastened to the housing 7 by a screw 6 on which the plate carrying the stationary cutter may be oscillated with the screw as a center. A screw 8 is threaded through a projection from the housing so as to bear against the edge of the plate 5 for the purpose of turning it and adjusting the stationary cutter. The adjusting screw 8 is fastened by a lock nut 9.

The housing is attached to the front end of a sleeve 10 that is rotatably held in the upper part of an oscillatory frame 11 which is pivotally mounted on an arbor 12.

The oscillatory cutter is a curved strip of suitable metal clamped by a screw 13 to the head of a rocker arm 14 which projects from the end of a shaft 15 that extends through the housing sleeve. Thus both the shaft that oscillates the movable cutter, and the sleeve that carries the housing containing the stationary cutter, are mounted concentrically in the upper end of the swinging frame 11, and the shaft is free to oscillate without turning the sleeve. The cutters are preferably formed on arcs of circles having the same center but as the normally stationary cutter plate is pivoted on the screw 6 below the center of the housing sleeve and shaft, which is the axis of the oscillatory cutter, when the stationary cutter is adjusted to take up wear its cutting edge tends to move inward toward the outer surface of the movable cutter. Furthermore owing to the relations of the centers, the oscillation of the movable cutter toward the stationary cutter is in such a curve that the cutting edges are sharpened rather than worn off, rounded and dulled under use.

At the other end of the oscillatory cutter shaft is a rocker arm 16 which is connected by a link 17 with one end of a bell crank lever 18 that is pivotally mounted on the arbor 12, upon which the frame carrying the cutter shaft and housing sleeve is mounted. The other end of the bell crank lever is by a link 19 connected with an eccentric 20 on the driving shaft 21. The rotation of the driving shaft, through the eccentric, bell crank lever, link and rocker arm causes the oscillations of the movable cutter, and as a result of the parallel link connection the housing with its sleeve and the cutter shaft may be swung on the arbor 12 to carry the cutters more or less toward and from the line of stitch substantially horizontally without interfering with the oscillatory movements imparted to the oscillating shaft, as more specifically set forth in the applications above mentioned.

A rod 22 is pivoted to an ear extending from the swinging frame, and on this rod is a spring 23 the thrust of which normally tends to push and hold the frame carrying the housing sleeve and cutter shaft with the cutters near the line of stitch. When the frame is swung away from the line of stitch sufficiently far to carry the axis of the connection with the frame of the spring rod past the center of the axis of the arbor 12 on which the frame is mounted, the spring, which is in the nature of a toggle spring, tends to hold the frame with the cutters out of operative position.

A lever 25 with a finger piece 26 is pivoted to the frame of the machine by a screw stud 27 the axis of which is coincident with the mean position of the axis of the connection of the link 17 with the bell crank lever 18. One end of this lever is connected by a screw 28 with the projection from the housing. When the finger piece is pressed down the housing is swung so as to carry the cutters away over to one side out of operative position. When the finger piece is raised the housing is swung forward so as to carry the cutters toward the line of stitch and into normal operating position. A tongue 29 is pivoted to the lever 25 by a screw 30 and this tongue is swung up into desired position by an adjusting screw 31 which screw may be clamped after the adjustment has been obtained, by the set screw 32. Adapted to engage the tongue 29 is a cam 33 which is pivoted on a screw 34 and which has a handle 35. When the cam handle is pushed over to one side, the cam engaging the tongue causes the lever 25 to draw the housing away from the line of stitch. When the handle is turned the other way the cam allows the spring that engages the frame which holds the housing to swing the housing toward the line of stitch. By means of the adjusting screw 31 the tongue 29 is adjusted to fix the normal position of the cutters, that is, if the adjusting screw is unscrewed the cutters will be carried close to the line of stitch, while if the adjusting screw is screwed in the cutters will be drawn away from the line of stitch, thus the normal width of the seam or distance of the trimming cutters from the line of stitch is determined by the adjustment of this adjusting screw which abuts against the tongue that is engaged by the cam.

When the machine is in operation if it is desired to widen the distance between the line of stitch and the cutters the cam handle is pushed over and the cam acting on the tongue causes the housing and cutters to be drawn further away to one side from the line of stitch, and then when the handle is pulled back the cutters will be carried toward the line of stitch, to the normal position with relation to the line of stitch to which they have been previously adjusted. A pin 36 is adapted to engage the handle for the purpose of limiting its movement so that the cutters will always be returned to exactly the same position, that is, to the same normal position with relation to the line of stitch. In order to regulate the distance that the cutters will be moved to one side so as to widen the seam a pin 37 is arranged to be engaged by the handle. This pin extends from a plate 38 which is pivoted on the screw 34 that holds the cam, and the plate is clamped by a screw 39. Upon loosening the screw 39 this plate may be adjusted so that the pin 37 will stop the handle at any desired place. When the machine is in operation the cutters will trim the edge of the fabric the normal distance from the line of stitch to which the cutters are adjusted, and then at any time the cam handle can be pushed to one side and the width of the seam increased, and this width will be the same each time depending upon the position of the stop pin 37. When it is again desired to resume the normal width of seam the cam handle is pulled over so as to engage the other stop pin. Thus by these means the distance from the line of stitch of the trimmed edge of the fabric may be adjusted both for ensuring a uniform normal width of seam, and then this width may be repeatedly increased a definite amount when desired, and again decreased so as to trim exactly the same normal width, or the same increased width, and all of these movements or adjustments of the trimming cutters may be carried on without interfering with the trimming action of the cutters.

The invention claimed is:—

1. A trimming mechanism for sewing machines comprising a stationary cutter, an oscillatory cutter, a movable support for said cutters, a spring adapted to normally force said support and cutters toward the line of stitch, an adjustable stop for limiting the movement of the support toward the line of stitch and provide for a desired normal line of cut, means when moved to one position withdrawing said support and cutters against the tension of the spring from said normal position, said means when in another position permitting the spring to return the support and cutters to the same normal cutting position, and means for withdrawing the support against the tension of the spring and carrying the cutters completely away from operative position, without interfering with the running of the machine.

2. A trimming mechanism for sewing machines comprising a stationary cutter, an oscillatory cutter, an oscillatory support for said cutters, means for swinging said support and adjusting the cutters with relation to the line of stitch to provide for a desired normal line of cut, and means for swinging said support and carrying the cutters from said normal line of cut and then returning the support and cutters to the same normal position.

3. A trimming mechanism for sewing machines comprising a stationary cutter, an oscillatory cutter, a support for said cutters, means for adjusting said support and cutters toward and from the line of stitch to provide for a normal line of cut, means for withdrawing said support and cutters from said normal position and then returning the support and cutters to the same normal position, and means for withdrawing said support and carrying the cutters completely away from operative position.

4. A trimming mechanism for sewing machines comprising a stationary cutter, an oscillatory cutter, a movable support for said cutters, a spring for forcing the support with the cutters toward the line of stitch, means for limiting the movement of the support with the cutters toward the line of stitch and providing for a desired normal line of cut, and means for moving the support with the cutters away from the line of stitch and then allowing the support with the cutters to return to the normal position.

5. A trimming mechanism for sewing machines comprising a stationary cutter, an oscillatory cutter, a movable support for said cutters, a spring for forcing the support with the cutters toward the line of stitch, adjustable means for limiting the movement of the support with the cutters toward the line of stitch and providing for a desired normal line of cut, and means for moving the support with the cutters away from the line of stitch and then allowing the support with the cutters to return to the normal position.

6. A trimming mechanism for sewing machines comprising a stationary cutter, an oscillatory cutter, an oscillatory support for said cutters, means for swinging the support and adjusting the cutters with relation to the line of stitch to provide for a desired normal line of cut, means for swinging said support and carrying the cutters further from said normal line of cut and then returning the support and cutters to the same normal position, and means for moving the support and carrying the cutters still further and completely away from operative position.

7. A trimming mechanism for sewing machines comprising a stationary cutter, an oscillatory cutter, an oscillatory support for said cutters, means for swinging the support and adjusting the cutters, with relation to the line of stitch to provide for a desired normal line of cut, means for swinging said support and carrying the cutter further from said normal line of cut and then returning the support and cutters to the same normal position, means for moving the support and carrying the cutters still further and completely away from operative position, and a toggle spring arranged to throw and hold the support with the cutters in operative position and also to throw and hold the support with the cutters out of operative position.

8. A trimming mechanism for sewing machines comprising a stationary cutter, an oscillatory cutter, a support for said cutters, means for adjusting said support and cutters toward and from the line of stitch to provide for a normal line of cut, means for withdrawing said support and cutters from said normal position and then returning the support and cutters to the same normal position, and a spring for holding said support and cutters in operative position.

9. A trimming mechanism for sewing machines comprising a curved normally stationary cutter, a curved oscillatory cutter co-operating therewith, a common adjustable support for said cutters, and means adapted to adjust said stationary cutter and carry its cutting edge on an arc that intersects the arc of movement of the cutting edge of the oscillatory cutter.

10. A trimming mechanism for sewing machines comprising a stationary cutter, an oscillatory cutter, an oscillatory support for said cutters, an oscillatory mounting on said support carrying the stationary cutter, and means for adjusting said mounting and carrying the cutting edge of the stationary cutter toward the path of movement of the oscillatory cutter in arc relation.

11. A trimming mechanism for sewing machines comprising a curved stationary cutter, a curved oscillatory cutter, a movable support for said cutters, a pivotally mounted clamp holding the stationary cutter to said support, means for adjusting said clamp and locating the cutting edge of the stationary cutter with relation to the path of movement of the oscillatory cutter, means for adjusting said support and carrying the cutters toward and from the line of stitch to provide for a desired normal line of cut, and means for withdrawing said support and cutters from said normal position and then returning the support and cutters to the same normal position.

12. A trimming mechanism for sewing machines comprising a stationary cutter, an oscillatory cutter, an oscillatory support for said cutters, a lever for swinging said support and moving the cutters toward and from the line of stitch to provide for a desired normal line of cut, and means adapted to act on said lever for swinging said support and carrying the cutters from said normal line of cut and then returning the support and cutters to the same normal position.

SAMUEL W. AVIS.